Oct. 3, 1961 J. P. GIBBS 3,002,530
PNEUMATIC POPPET VALVE
Filed Jan. 27, 1958 2 Sheets-Sheet 1
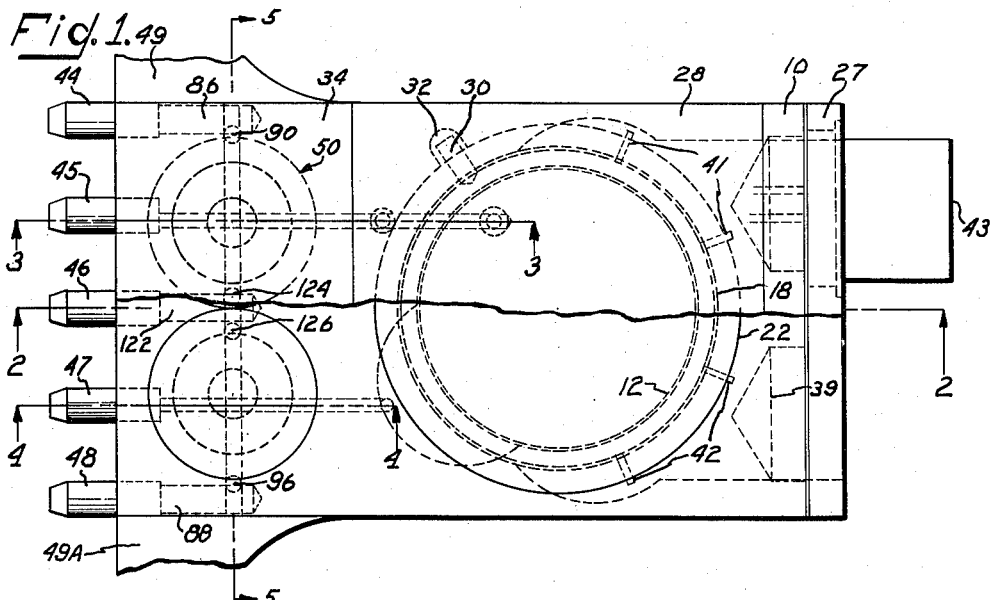
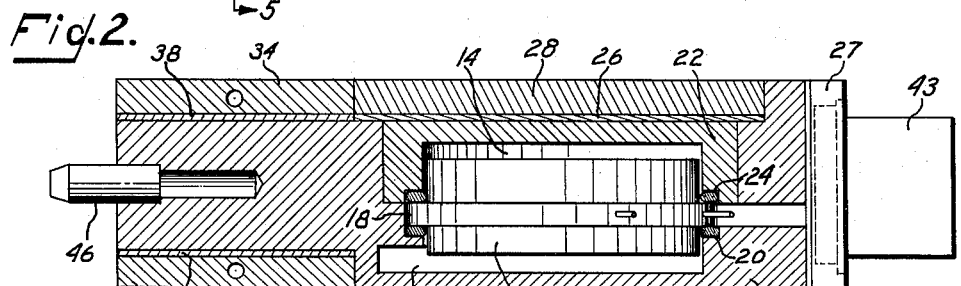
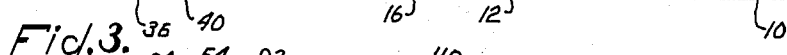
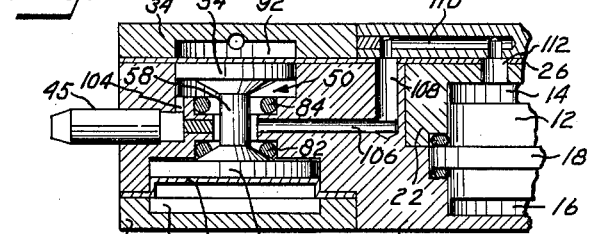
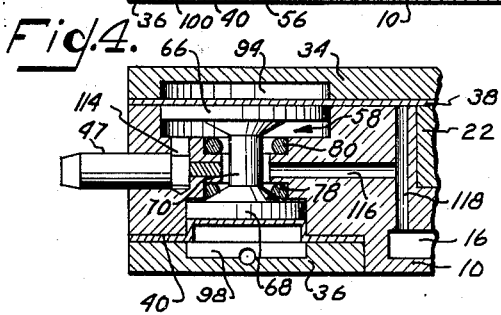
INVENTOR.
JOSEPH P. GIBBS
BY
Christie, Parker & Hale
ATTORNEYS

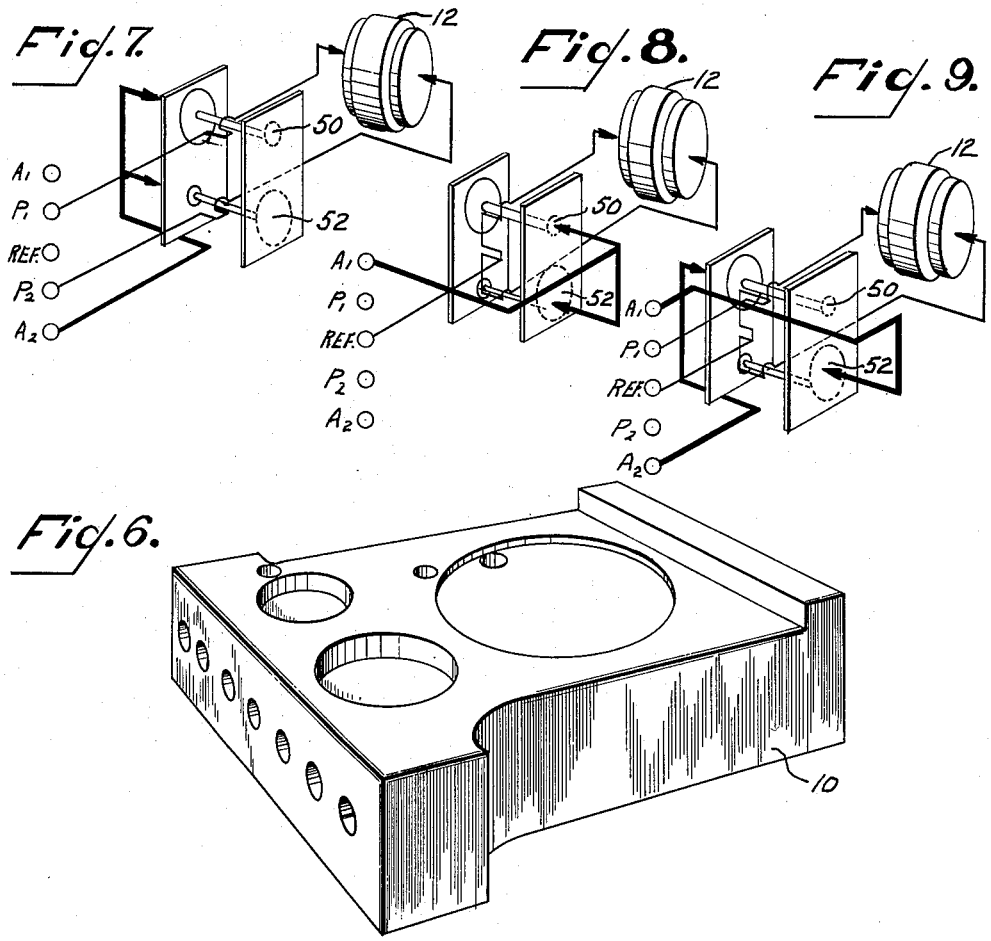

United States Patent Office 3,002,530
Patented Oct. 3, 1961

3,002,530
PNEUMATIC POPPET VALVE
Joseph P. Gibbs, Pasadena, Calif., assignor, by mesne assignments, to Consolidated Electrodynamics Corporation, Pasadena, Calif., a corporation of California
Filed Jan. 27, 1958, Ser. No. 711,462
6 Claims. (Cl. 137—594)

This invention relates to devices controlled from a remote location and more particularly to such apparatus involving poppet type valves.

Transducers may be employed in airplanes, missiles, rockets and the like for measuring various parameters. Differential pressure transducers or pickups often are employed in an air foil to measure pressures at different points along a belt line or cord in order to determine the forces acting on the airfoil. In order to secure accurate measurements with pickups thus disposed, it is necessary to minimize errors in the pickups resulting from changes in environmental conditions, chief among which is temperature. It is not necessary to eliminate the inherent error resulting from environmental conditions because measurements can be secured by calibrating or determining the error inherent in any given environmental situation and subtracting the error thus obtained from any readings made in this environment. If an airfoil is subjected to different environmental conditions, it is necessary to provide some way to calibrate or determine the inherent error for each environmental condition if accurate measurements are to be obtained. When pickups are employed in wing structures, whether undergoing tests in a wind tunnel or aloft in flight, calibration by remote control becomes necessary if inherent error is determined for each change of environmental conditions.

Earlier systems for determining the forces acting on an airfoil employed strain gauges dispersed at various points throughout the air foil. Subsequently strain gauges were replaced by pressure pickups since more accurate measurement of the forces acting on a wing could be made. Because inherent errors were present in the readings obtained from such pickups, solenoid actuated valves were used with pressure pickups in an attempt to calibrate or determine the inherent error from a remote location. Calibration was accomplished by manipulating the solenoid actuated valves to vent both sides of the differential pressure pickup to the atmosphere. The reading of the differential pickup thus obtained represented inherent error, and this might be subtracted from the differential pressure measured across a wing structure to determine the true differential pressure acting on the wing. However, because there was relative movement between the differential transducers and the atmosphere when determining inherent error, the calibration pressure was dynamic in that it varied with speed, air density and other factors determined by the atmosphere. If the dynamic pressure was not applied uniformly and simultaneously to both sides of the pickup or if the rate at which the pressure varied was of shorter duration than the time constant of the pickup, an error in calibration resulted. A further disadvantage, moreover, was the presence of solenoid actuated valves in and around fuel compartments of airplanes, missiles or rockets, considered unsafe since a spark from a solenoid might ignite the fuel.

Resort was then made to the use of pressure pickups operated by hydraulic valves controlled from a remote location. Such a system permitted in-flight calibration of the pickups and eliminated the fire hazard posed by the solenoids of the earlier system. For the purpose of calibrating or determining inherent error static pressure instead of dynamic pressure was applied to both sides of the differential pressure pickup, and this served to eliminate any error in calibration which might result from the use of dynamic pressure. Because the valving arrangement was controlled hydraulically, oil tight lines were required, and leaks in the hydraulic lines and particularly in the valving arrangement often occurred.

According to the present invention a novel arrangement of a pressure pickup and a pneumatic control valve is provided which overcomes the disadvantages of earlier devices. The valve control device is actuated from a remote location to selectively admit any one of a combination of three sources of pressure to the pickup. More specifically, the valve assembly includes a pair of compound poppet valves with each compound poppet valve having a pair of heads, one head of which has a larger diameter and hence a larger surface area than the other. The larger heads of the compound poppet valve are disposed in an opposing relationship. A first actuation pressure is applied to one head of each compound poppet valve to set both valves in one position. One of the three sources of pressure is a static source of pressure designated reference pressure. For calibration purposes it is necessary to supply the static reference pressure to both sides of the pickup to determined error of the pickup resulting from environmental conditions as well as other factors. The reference pressure is applied to both sides of the pickup when the first actuation pressure is applied to one head of each compound poppet valve. A second actuation pressure is applied to the other head of each compound poppet valve to set both valves in a second position and thereby admit two of the three sources of pressure to opposite sides of the pickup. These two pressures may be those from the upper and lower side of an airfoil for instance. Because one head of each compound poppet valve is larger than the other and since the valves are disposed in opposing relationship, the application of the first actuation pressure to one head of each compound poppet valve and the application of the second actuation pressure to the other head of each compound poppet valve causes the two poppet valves to assume different positions and thereby admit reference pressure and one of the two other pressures to opposite sides of the pickup. The other pressure may be that from either the upper or lower side of an airfoil, for example.

Since the first and second actuation pressures may be controlled from a remote location to actuate the pair of compound poppet valves, the pickup and valving arrangement may be positioned in a wing structure of an aircraft and controlled by an operator within the craft. Similarly the pickup and valving arrangement may be positioned in an airfoil located in a wind tunnel and controlled by an operator in a remote location. Furthermore the pickup and valving arrangement may be disposed in a missile or rocket and the first and second actuation pressures controlled from a radio station on the ground.

These and other features of this invention may be more fully appreciated when considered in the light of the following specification and drawings in which:

FIG. 1 is a plan view of a poppet valve and pickup arrangement according to the present invention;

FIG. 2 is a cross-sectional view taken on the line 2—2 in FIG. 1;

FIG. 3 is a cross-sectional view taken on the line 3—3 in FIG. 1;

FIG. 4 is a cross-sectional view taken on the line 4—4 in FIG. 1;

FIG. 5 is a cross-sectional view taken on the line 5—5 in FIG. 1;

FIG. 6 is a perspective view of a block on which the pickup and poppet valve arrangement are disposed;

FIGS. 7, 8 and 9 illustrate in schematic form the manner in which various inlet pressures are applied to opposite sides of the pickup with different actuation pressures.

Reference is made to FIGS. 1 through 6 for a detailed description of an assembly including a pneumatic poppet valve arrangement and a transducer according to the present invention. As illustrated in FIGS. 1 and 2, the assembly includes a block 10 in which is mounted a pressure transducer or pickup 12 of the type which measures the difference between a pressure supplied to the chamber 14 above the transducer and a pressure supplied to the chamber 16 below the transducer. It is necessary to isolate the chambers 14 and 16 from one another, and it is desirable to provide a shockproof mount for the pickup 12. For these purposes the pickup 12 has a flange 18 which rests on an O-ring 20, and a pickup retaining ring 22 is disposed over another O-ring 24 on the upper side of the flange 18. Thus the O-rings 20 and 24 serve to isolate fluid in the opening 14 from fluid in the opening 16, and at the same time these Orings provide shockproof mounting whereby the pressure pickup 12 is protected against shock or forces of acceleration. The annular pickup retaining ring 22 and O-rings 20 and 24 serve to provide an air seal, isolating the chambers 14 and 16 from the influence of pressures outside the assembly. A gasket 26 made of rubber, cork, or the like is disposed over the pickup retaining ring 24 and isolates the pickup retaining ring from pressures outside the assembly, thereby further insuring freedom of the chambers 14 and 16 from any pressures outside the assembly. A pickup cover plate 28 fastened to the top of the block 10 holds the gasket 26 and the pickup retaining ring 22 securely in position. An adjustable bolt or screw 30, shown in FIG. 1, is located in a recess 32 and screwed into the retaining ring 22 to prevent rotation of the ring and hence misalignment of passageway 112. An upper poppet valve cover plate 34 and a lower poppet valve cover plate 36 are secured to the block 10 against respective flexible gasket members 38 and 40. Electrical input terminals 41 and electrical output terminals 42 for the pickup 12 are coupled by leads not shown to an electrical connector 43. The electrical connector 43 is mounted in an end plate 27. The end plate 27 may be installed as shown with the electrical connector inserted in a recess on one side of the block 10, or it may be rotated and the electrical connector inserted in a similar recess 39 on the opposite side of the block. This is useful where a number of blocks are ganged together since the electrical connectors may be staggered to provide more access space.

Inlet nipples 44 thorugh 48 are employed to couple various pressures to the assembly. Pressures under investigation are supplied to the pickup 12 through inlet nipples 45 through 47, and pressures for actuating poppet valves are supplied through the inlet nipples 44 and 48. The nipples may be tightly sealed to the inlet sources of pressure by any suitable means. If the block 10 is secured to a manifold as by bolts through wings on either side 49 and 49A, O-rings may be employed to form a tight seal. For this purpose it is convenient to place an O-ring of proper size around each nipple and abutting the block 10. When the wing bolts are tightened and block 10 drawn toward the manifold, the O-rings may be pressed in a suitable fitting in the manifold to seal the nipples.

Reference is made now to FIGS. 3 through 5 for a detailed description of the unique valving arrangement according to the present invention. Referring more specifically to FIG. 5, a pair of compound poppet valves 50 and 52 are disposed on the respective left and right sides of the block 10. The poppet valve 50 includes an upper head 54 and a lower head 56 interconnected by a stem 58. The stem 58 includes a threaded bore 60 integral with the head 54 and a threaded bolt portion 62 integral with the lower head 56. The latter is screwed into the former to provide a stem which is both sturdy in construction and adjustable in length to permit proper spacing of the heads 54 and 56 from each other. A clearance is provided between the stem 58 and the annular projecting portion 64 of the block 10. This clearance provides for easy movement of the poppet valve 50 and also permits fluids or gases to flow therethrough, in a manner explained subsequently, to the pickup 12 shown in FIGS. 1 and 2. The surface area of the top portion of the head 54 is smaller than the surface area of the lower portion of the head 56. This construction is useful for adjusting the position of the poppet valves and thereby controlling the admission of fluids under investigation to the pickup 12 shown in FIG. 1. The poppet valve 52 in FIG. 5 is identical in construction to that of the poppet valve 50. It should be noted, however, that the surface area of the upper head 66 is larger than the surface area of the lower head 68. In this respect the poppet valves 50 and 52 are the reverse of each other. A stem 70 interconnects the upper head 66 and the lower head 68. The lower head includes a threaded bore 72 made integral therewith, and the upper head includes a threaded portion 74 made integral therewith. The threaded portion 74 is screwed into the threaded bore 72 to provide a stem which is both sturdy and adjustable in length. A clearance is provided between the stem 70 and an annular flange 76 of the block 10. This clearance permits easy movement of the valve 52 and also permits the passage of fluids or gases under investigation to the pickup 12 shown in FIGS. 1 and 2. O-rings 78 and 80 in FIG. 5 are respectively disposed below and above the annular flange 76 to form a fluid tight seal with the respective heads 68 and 66 when they engage the O-rings. In a similar fashion O-rings 82 and 84 form a fluid tight seal with the respective heads 56 and 54 of the poppet valve 50 when these heads engage the O-rings.

The poppet valves 50 and 52 are actuated up and down by fluid under pressure supplied through the passageways 86 and 88. If air or other suitable fluid under pressure is supplied through the inlet nipple 44 of FIG. 1 to passageway 86, as seen in FIG. 5, it passes up through a passageway 90 to a chamber 92 and through a recess 91 in the lower side of the cover plate 34 to a chamber 94, the chambers 92 and 94 lying above the respective poppet valve heads 54 and 66. Because the gasket or membrane 38 is flexible, the fluid pressure acting on the heads 54 and 66 forces the poppet valves 50 and 52 downward into engagement with respective O-rings 84 and 80. If air or other suitable fluid under pressure is supplied through the inlet nipple 48 of FIG. 1 to passageway 88, as seen in FIG. 5, it passes down through a passageway 96 to a chamber 98 and through a recess 99 in the upper side of the cover plate 36 to a chamber 100, the chambers 98 and 100 lying below the respective poppet valve heads 68 and 56. Because the gasket or membrane 40 is flexible, the fluid pressure acting on the heads 56 and 68 forces the poppet valves 50 and 52 upward into engagement with the respective O-rings 82 and 78 in the manner shown. Note how the flexible membrane 40 is distorted to conform to the contour of portions of the block 10 and the heads 56 and 68. This flexible membrane 40 serves the useful purpose of isolating the actuation pressure applied to the lower chambers 98 and 100 from the fluid pressures under investigation which pass through the clearance about the stems 58 and 70 to the pickup shown in FIGS. 1 and 2. If fluid under pressure is applied simultaneously through inlet nipples 44 and 48 in FIG. 1 through respective passageways 86 and 88 to both the upper chambers 92 and 94 in FIG. 5 and the lower chambers 98 and 100, the valve 50 is forced upward until the head 56 engages the O-ring 82, and the valve 52 is forced downward until the head 66 engages the O-ring 80. This result follows when the same pressure is applied to both heads of each valve because one head of each valve has a larger surface area than the other. Consequently, the head of larger surface area has a greater net force which moves it into engagement with its respective O-ring. Note that the head 56 of the valve 50 has a greater surface area than the head 54, and hence this valve is forced upwardly with the head 56 engaging the O-ring 82. Likewise the head 38 of the valve 52 has a larger surface area than the head 68, and the net force on this value is, therefore, downwardly, forcing the head 38 into engagement with the O-ring 80. Thus it is seen that if actuation pressure is applied to both heads of each compound poppet valve, the poppet valve 50 is forced upwardly and the poppet valve 52 is forced downwardly.

It is appropriate at this point to observe the manner in which actuation pressure applied to the inlet nipples 44 and 48 in FIG. 1 control the application of three pressures through respective inlet nipples 45 through 47 to the pickup 12. For convenience of discussion, actuation pressure applied to the inlet nipples 44 and 48 is referred to hereinafter as actuation pressure ($A_1$) and actuation pressure ($A_2$), respectively. Similarly, the three pressures applied to inlet nipples 45 through 47 are designated respectively as pressure 1 ($P_1$), reference pressure (Ref.) and pressure 2 ($P_2$). The foregoing symbols, $A_1$, $A_2$, $P_1$, $P_2$, and Ref. are used in the drawings to designate these pressures.

If it is assumed that actuation pressure $A_2$ is applied to the inlet nipple 48 in FIG. 1 and the inlet nipple 44 is vented to the atmosphere, the poppet valves 50 and 52 are forced upward into engagement with respective O-rings 82 and 78, as shown in FIGS. 3 through 5. Pressure $P_1$ applied to the inlet nipple 45 passes upwardly, as shown in FIG. 3, through a passageway 104, against the lower side of the head 54, downwardly through the clearance around the stem 58, then to the right through a passageway 106, upwardly through a passageway 108, to the right through a passageway 110 and downwardly through a passageway 112 to the chamber 14 above the pickup 12. At the same time, pressure $P_2$ applied to the inlet nipple 47 in FIG. 1 passes upwardly, as shown in FIG. 4, through a passageway 114, to the lower side of the head 66, downwardly and around the stem 70, to the right through a passageway 116 and downwardly through a passageway 118 to the chamber 16 below the pickup 12. Since the pressures $P_1$ and $P_2$ are applied to the respective upper and lower sides of the pickup 12, the difference ($P_1-P_2$) in pressure is measured since the pickup 12 is a pressure differential measuring device, as earlier pointed out. Thus it follows that when actuation pressure $A_2$ is applied and $A_1$ is either atmospheric pressure or some pressure less than $A_2$, pressure $P_1$ is applied to the upper side of the pickup and pressure $P_2$ is applied to the lower side of the pickup, providing a measurement of the pressure differential $P_1-P_2$. This condition of the poppet valves and the application of pressures $P_1$ and $P_2$ to the pickup are indicated schematically in FIG. 7. Note that pressure $A_2$ is applied to the same end of both valves and the pressures $P_1$ and $P_2$ pass through the poppet valves to opposite sides of the pressure pickup.

The characteristics of a pickup often change under operating conditions as a result of variations in temperature, electrical parameters and other factors, depending upon the particular type of pickup involved. It is quite often a simple matter to calibrate a pickup to determine any inherent error under given circumstances. When a pickup is located in a remote or isolated area, however, the calibration for given operating conditions may be difficult, if not impossible, to perform. This is especially true, for example, when pressure pickups are employed in the wings of airplanes or in missiles and rockets. With a poppet valve arrangement according to the present invention, it is a simple matter to control actuation pressures to calibrate or determine the zero or reference point of a pickup and thereby compensate for any inherent error resulting from a change from time to time of the environment of the pickup.

In order to illustrate how the inherent error of a pickup is ascertained according to the present invention, assume that actuation pressure $A_1$ is applied to the inlet nipple 44 in FIG. 1 and that actuation pressure $A_2$ is not applied to the inlet nipple 48. In practice the inlet nipple 48 may be vented to the atmosphere. Actuation pressure $A_1$ applied to the inlet nipple 44 in FIG. 1 passes through a passageway 86 and upwardly through the passageway 90, better seen in FIG. 5, to the upper chambers 92 and 94. Because the actuation pressure is applied to the heads 54 and 66 of respective poppet valves 50 and 52, these valves are forced downwardly with the head 54 engaging the O-ring 84 and the head 66 engaging the O-ring 80. As more clearly seen in FIG. 3, pressure $P_1$ cannot reach the passageway 106 when the poppet valve 50 is seated against the O-ring 84. Likewise, as more clearly seen in FIG. 4, the pressure $P_2$ cannot reach the passageway 116 when the poppet valve 52 is seated against the O-ring 80. Thus the pressures $P_1$ and $P_2$ are not applied to opposite sides of the pickup 12 whenever actuation pressure $A_1$ only is applied. Instead, reference pressure applied through the nipple 46 in FIG. 1 travels through passageway 122, and as more clearly seen in FIG. 5, it passes through passageways 124 and 126 to the upper sides of respective heads 56 and 68. Both heads being down at this time, reference pressure passes upward around the stems 58 and 70 to respective passageways 106, better seen in FIG. 3, and 116, better seen in FIG. 4. The reference pressure from passageway 106 in FIG. 3 is applied to the upper side of the pickup 12, while the reference pressure in the passageway 116 in FIG. 4 is applied to the lower side of the pickup. The application of actuation pressure $A_1$ to the poppet valves and the application of reference pressure to both sides of the pickups is schematically illustrated in FIG. 8.

Since reference pressure is applied to both sides of the pickup, any measurement provided by the pickup represents an error. Accordingly, this reading or indication may be used to correct subsequent readings and thereby provide an accurate indication of the parameter measured. For example, if the pickup provides a reading of 0.5 p.s.i. when reference pressure is applied to both sides thereof, this quantity may be subtracted from a subsequent reading of 10 p.s.i. when $P_1$ and $P_2$ are measured, for example, to provide an accurate measurement of 9.5 p.s.i., the latter value being the true difference in pressure of $P_1$ and $P_2$.

It is sometimes desirable to determine not only the difference in pressure of $P_1$ and $P_2$, but also the actual value of $P_1$ and $P_2$. If a known reference pressure is employed and a reading taken with either $P_1$ or $P_2$ applied to one side of the pickup 12 in FIG. 1 and the known reference pressure applied to the other side, then the true value of pressures $P_1$ and $P_2$ can be calculated. Assuming $P_1$ and reference pressure are applied to the pickup, this difference in pressure is determined. If $P_1$ and $P_2$ are applied to the pickup, the difference of these pressures is determined. $P_2$ can be readily calculated by adding the known reference pressure to the differential pressure of $P_1-$Ref. and subtracting therefrom the differential pressure $P_1-P_2$. Once $P_2$ is determined, $P_1$ may be calculated by adding $P_2$ to the differential pressure $P_1-P_2$.

For the purpose of illustrating how the differential pressure $P_1-$Ref. is obtained, assume that equal values of actuation pressure $A_1$ and actuation pressure $A_2$ are applied to respective inlet nipples 44 and 48 in FIG. 1. Actuation pressure $A_1$ travels through the passageway 86 and upward through the passageway 90, better seen in FIG. 5, to the upper chambers 92 and 94. Simultaneously the actuation pressure $A_2$ travels through the passageway 88 in FIG. 1 and through the passageway 96, better seen in FIG. 5, to the lower chambers 98 and 100. As previously explained, this forces the compound poppet valve 50 upwardly and the compound poppet valve 52 downwardly. As can be seen in FIG. 4, the pressure $P_2$ is prevented from reaching the passageway 116 because the upper head 66 of the poppet valve 52 is seated against the O-ring 80. As illustrated in FIG. 3, the pressure $P_1$ is applied through the inlet nipple 45, the passageway 104, around the stem 58 to the passageway 106, through the passageways 108 and 110 to the upper chamber 14 above the pickup 12. Simultaneously reference pressure is admitted through the inlet nipple 46 in FIG. 1 through passageway 122 to the passageways 124 and 126, better seen in FIG. 5. Since the head 56 of the poppet valve 50 is seated against the O-ring 82, the reference pressure from the passageway 124 is blocked. The reference pressure in the passageway 126 passes around the stem 70 of the poppet valve 52, this poppet valve being in the down position, to the passageway 116, better seen in FIG. 4, then through the passageway 118 to the chamber 16 on the lower side of the pickup. Thus it is seen that the pickup measures the differential pressure of $P_1$—Ref. The application of actuation pressures $A_1$ and $A_2$ to the poppet valve and the application of pressures $P_1$ and Ref. to the pickup are illustrated schematically in FIG. 9.

Thus it is seen that a unique and novel poppet valve arrangement is provided according to the present invention to control the application of different combinations of pressures to a transducer such as a pressure differential pickup. The assembly is constructed of parts the dimensions of which need not involve close tolerances. The O-rings employed for static seals may be selected from standard sizes readily available. Since pickups are usually very sensitive instruments, they should be protected. According to the present invention, the pickup is protected from actuation air pressure, usually much greater than the measured pressures, by means of a flexible gasket or membrane disposed between the poppet valves and the actuation pressure. Since no springs are required to operate the poppet valves all of the actuation force can be employed as sealing force. The minimum sealing force must equal the product of the actuation air pressure and the area of the head of smaller poppet valve in those instances when actuation pressure is applied to one side only of both valves. In the case where the actuation pressure is applied simultaneously to all heads of the valves, the product of the actuation air pressure and the area of the larger head minus the area of the smaller head for each valve must equal the minimum sealing force. It is a simple matter to increase actuation pressure to provide whatever sealing or closing force is desired. This is especially useful in missiles, rockets or aircraft where, because of sudden forces of acceleration, a greater actuation pressure may be required. Positive valve actuation is guaranteed at all times since actuation pressure is maintained on the valve faces in any one of the three modes of poppet valve operation illustrated.

Instead of using flexible diaphragms 38 and 40 to seal the poppet valves from the actuation air pressure, dynamic O-rings for each head may be suitably employed. Numerous other arrangements may be made without departing from this invention.

What is claimed is:

1. An apparatus for selectively applying a plurality of pressures to a pressure responsive transducer including a block, a chamber within the block adapted to hold a transducer, three pressure inlets coupled to said block, a valve assembly disposed in said block between said pressure inlets and said chamber, said block having passageways interconnecting the pressure inlets and the valve assembly and passageway interconnecting the valve assembly and the chamber, said valve assembly including a pair of compound poppet valves, each compound poppet valve having a pair of heads of unequal surface area, the heads of the compound poppet valves having the largest surface area being disposed in opposing relationship, means to apply actuation pressure to one head of each compound poppet valve to set both valves in one position, means to apply actuation pressure to the other head of each compound poppet valve to set both valves in a second position, said valves being set to opposite positions by the application of actuation pressure to both heads of both valves whereby each different setting of said valves admits one or more of said three pressures to said chamber.

2. An apparatus for selectively applying a plurality of pressures to a pressure responsive pickup including a block, a chamber within the block adapted to hold a pickup, a plurality of inlet devices coupled to the said block and adapted to admit a plurality of fluids, a valve assembly disposed in said block between said pressure inlets and said chamber, said block including passageways connecting said plurality of inlet devices to said valve assembly and passageways connecting said valve assembly and the chamber, said valve assembly including a pair of compound poppet valves, each compound poppet valve having a pair of heads one of which has a larger surface area than the other and a stem connecting the pair of heads, the larger heads of each compound poppet valve being disposed in opposing relationship, means to apply an actuation pressure to either or both heads of each compound poppet valve whereby the compound poppet valves may assume three different settings and thereby admit one or more of said plurality of pressures to said chamber.

3. A valve assembly including a plurality of pressure inlets coupled to a block, a chamber within said block, passageways interconnecting said pressure inlets and said chamber, a pair of compound poppet valves disposed within said passageways, each compound poppet valve having a pair of heads one of which is larger in surface area than the other, a pair of O-rings positioned in each passageway in seatable relationship with respect to each valve, one O-ring being located in a passageway between one head and the block, the other O-ring being located in the same passageway between the other head and the block, a stem for each poppet valve interconnecting the heads of each poppet valve, the length of said stem being adjustable whereby when one head of each valve is seated on its associated O-ring the opposite head of each valve disengages its associated O-ring, a source of actuation pressure, means to couple said actuation pressure to either or both heads of said compound poppet valves whereby the poppet valves are both actuated to one position when said actuation pressure is applied to one head of each valve, the poppet valves are actuated to a second position when actuation pressure is applied to the opposite head of each compound poppet valve, and the poppet valves are actuated to a third position when actuation pressure is applied to both heads of both compound poppet valves, said positions of the poppet valves selectively controlling admission of pressures to said chamber.

4. The apparatus of claim 3 wherein a flexible member is disposed between one head of each compound poppet valve and the source of actuation pressure and another flexible member is disposed between opposite heads of said compound poppet valves and the source of actuation pressure.

5. A valve control assembly including a plurality of inlets coupled to a block and connected to a plurality of sources of pressure including a source of actuation pressure, a chamber within said block, passageways interconnecting said inlets and said chamber, a pair of compound poppet valves positioned within said passageways, each poppet valve including a pair of heads displaced from one another by an interconnecting stem, one head of each poppet valve having a greater surface area than the other head of the same valve, the larger head of one compound poppet valve and the smaller head of the other compound poppet valve being disposed to receive actuation pressure simultaneously, the remaining head of each compound poppet valve being disposed to receive actuation pressure simultaneously, means to apply actuation pressure simultaneously to the larger head of one compound poppet valve and the smaller head of the other compound poppet valve whereby said poppet valves are set in one position, means to apply actuation pressure simultaneously to the remaining head of each compound poppet valve whereby said poppet valves are set in a second position, said compound poppet valves being set in a third position with each valve located in opposite positions when actuation pressure is applied simultaneously to both heads of each valve, said positions of the poppet valves selectively controlling admission of pressures to said chamber.

6. The apparatus of claim 5 wherein a flexible membrane is disposed between one head of each compound poppet valve and said actuation pressure and a flexible membrane is disposed between the remaining heads of said compound poppet valves and said actuation pressure.

References Cited in the file of this patent

UNITED STATES PATENTS

| | | |
|---|---|---|
| 2,376,918 | Hughes | May 29, 1945 |
| 2,400,992 | Hebeler | May 28, 1946 |
| 2,484,102 | Le Valley | Oct. 11, 1949 |
| 2,587,821 | Chouinard | Mar. 4, 1952 |
| 2,677,390 | Davis | May 4, 1954 |
| 2,699,069 | Bailey | Jan. 11, 1955 |
| 2,700,986 | Gunn | Feb. 1, 1955 |
| 2,766,612 | Michels | Oct. 16, 1956 |

UNITED STATES PATENT OFFICE
CERTIFICATE OF CORRECTION

Patent No. 3,002,530            October 3, 1961

Joseph P. Gibbs

It is hereby certified that error appears in the above numbered patent requiring correction and that the said Letters Patent should read as corrected below.

Column 2, line 11, for "of" read -- or --; column 5, line 5, for "value" read -- valve --.

Signed and sealed this 3rd day of April 1962.

(SEAL)
Attest:

ERNEST W. SWIDER
Attesting Officer

DAVID L. LADD
Commissioner of Patei